United States Patent [19]

Gerum et al.

[11] Patent Number: 5,069,931
[45] Date of Patent: Dec. 3, 1991

[54] METHOD OF PREPARING A MAGNETIC RECORDING MEDIUM

[75] Inventors: Johannes Gerum, Unterpfaffenhofen; Horst Schulz, Miesbach; Jürgen Sauter, Munich, all of Fed. Rep. of Germany

[73] Assignee: BASF Magnetics GmbH, Werk Munich, Fed. Rep. of Germany

[21] Appl. No.: 686,425

[22] Filed: Apr. 16, 1991

Related U.S. Application Data

[62] Division of Ser. No. 478,137, Feb. 9, 1990.

[30] Foreign Application Priority Data

Feb. 25, 1989 [DE]  Fed. Rep. of Germany ....... 3905910

[51] Int. Cl.$^5$ .............................................. H01F 10/02
[52] U.S. Cl. .................................... 427/128; 428/900
[58] Field of Search ................................ 427/128–132, 427/48; 428/900, 694, 695

Primary Examiner—Bernard Pianalto
Attorney, Agent, or Firm—Connolly and Hutz

[57] ABSTRACT

A magnetic recording medium consisting of a flexible layer support and a magnetic layer consisting predominantly of magnetic particles finely divided in a binder and nonmagnetic additives applied to the layer support is obtained with improved orientation of the magnetic pigments by adding a dispersion stabilizing component to the magnetic dispersion at a uniform rate over the whole period of dispersion. Highly purified lecithin or a mixed ester of a polyethoxy phosphate ester or ethylene diaminodistearate, a polyurethane resin containing sulphonate groups or a vinyl chloride/vinyl alcohol copolymer is preferred as stabilizing additive.

11 Claims, No Drawings

METHOD OF PREPARING A MAGNETIC RECORDING MEDIUM

This application is a division of application Ser. No. 478,137, filed on Feb. 9, 1990.

This invention relates to a magnetic recording medium consisting of a flexible layer support to which is applied a magnetic layer consisting mainly of magnetic particles finely divided in a binder and non-magnetic additives.

It is known that the recording quality of a magnetic recording medium depends to a large extent on the homogeneity of the interior of the magnetic layer and the smoothness of the surface of the magnetic layer. Lack of homogeneity may be due to the presence of incompletely broken down agglomerates of pigment, the reagglomeration of pigment particles originally subdivided monodispersly or differences in the thickness of the layer of pigment particles covering the surface, which incidentally also impairs the orientation.

The proportion of primary pigment agglomerates may be substantially reduced by intensive grinding of the magnetic dispersion but if the pigment agglomerates are sintered or chopped down to different degrees, the proportions of pigment which are broken down more readily will be ground down excessively before the sintered pigment needles have been subdivided sufficiently.

The portions of broken or damaged pigment needles resulting from such treatment show a completely different adsorption of the components of the formulation on the surface of the pigment than the undamaged individual pigment needles which have been carefully separated.

Differences in the covering of the pigment surfaces results in a time and temperature dependent rearrangement of the contents of the formulation on the pigment surface, which in turn leads to reagglomeration of the magnetic dispersion and hence non-uniformity of the magnetic layer in space and time.

Since individual broken pigment needles may be sufficient to cause this secondary agglomeration of the magnetic dispersion, it has not hitherto been possible to avoid the associated decay in the recording signal.

This effect is very noticeable when recording video signals, especially in the case of high density recording with critical wave lengths of 0.5 to 1.0 $\mu$m. A monodisperse magnetic dispersion is therefore an essential precondition for fulfilling the increasing demand for storage capacity and for ensuring the necessary reliability of operation of a modern magnetic medium.

In JP 62-041 274, the necessary variation in intensity of dispersion over the whole grinding period is taken into account by adding varying quantities of solvent to the dispersion at certain points in time but this has the disadvantage that the components of the formulation vary in concentration over the grinding period, which in itself entails nonuniformity of adsorption.

In JP-N 56/148 727, a small amount of dispersing auxiliary agent is added after the viscosity for dispersion has been adjusted by means of pure solvent and before dispersion is carried out, but this is not sufficient for uniformly covering the new pigment surfaces formed during the process of dispersion.

The stepwise addition of solvent during dispersion as described in JP 61/090330 enables the paste to be adjusted to the required viscosity for dispersion by kneading but it does not ensure that the new pigment surface formed during grinding will be sufficiently covered with components of the formulation.

It is therefore an object of the present invention to ensure that the new permanent pigment surfaces formed during the dispersion of the magnetic formulation will be covered with dispersion stabilizing components of the formulation immediately after their formation.

It was surprisingly found that the orientation and hence the homogeneity of the layer, the smoothness of surface obtainable and as a result the storage technique of a magnetic medium could be substantially improved by adding a dispersion stabilizing component to the magnetic dispersion at a rate uniformly distributed over the whole time of dispersion.

It was found that both low molecular weight compounds having a molecular weight below 10,000 and relatively high molecular weight compounds having a molecular weight from 10,000 to 100,000 could provide the desired monodisperse distribution of the magnetic pigment if they were added at a uniform rate over the whole time of dispersion.

Among the many known low molecular weight dispersion stabilizing components, highly purified lecithin (Lethicon of Nattermann, Reinlecithin of Stern, Lipotin of L. Meyer) as well as a mixture of a polyethoxy phosphate ester (Gafac of GAF) or of ethylenediaminodistearates were found to be particularly suitable.

Among the higher molecular weight compounds with built in functional groups investigated, those found to be suitable included inter alia a carboxyl group-containing copolymer based on vinyl chloride and vinyl alcohol (Ucarmag 528 of Union Carbide), a sulphonate group-containing polyurethane (UR-8300 of Toyobo Co. Ltd.) and a polyiminopolyester (Hypermer MT 1 of ICI).

In addition to the improved mechanical and storage technical properties obtained by the addition according to the invention of dispersion stabilizing substances, an economical advantage is obtained from the fact that the magnetic dispersions obtained may have substantially higher solids content. This reduces the quantity of solvent required for preparing the dispersion. Further, the volumes of formulation to be prepared, dispersed, filtered and transported are reduced and much less energy is required for drying the recording medium.

The magnetic dispersions are prepared in known manner. After the introduction according to the invention of the dispersion stabilizing component evenly distributed over the whole dispersion time, the magnetic dispersion is applied to a nonmagnetic support from a casting apparatus and processed to the required format as a tape or disc.

The solvents used may be any liquids capable of dissolving the selected binder; for example, tetrahydrofuran, dioxane, dimethyl formamide, cyclohexanone, methylethyl ketone, toluene, methyl-isobutyl ketone as well as others, optionally used in combination with one another.

The dispersion auxiliaries or dispersion stabilizing substances used are chosen from the many known surface active compounds such as, for example, lecithin, cephalin, fatty acid amines or diamines, fatty acid amides or diamides, fatty acids or their ammonium salts, ethoxylated fatty acid derivatives, aliphatic or aromatic, optionally ethoxylated phosphoric acid esters, sulpho succinic acid esters, sorbitan esters, aliphatic or aromatic sulphonic acids or sulphonates, fatty alcohol sulphates, etc..

The magnetic pigments used are preferably needle shaped particles of iron or of an iron alloy such as iron cobalt or iron nickel having an average particle length of from 0.1 to 1.0 μm and a ratio of longitudinal to transverse axis of about 1:10.

Finely divided γ-$Fe_2O_3$, $Fe_3O_4$, cobalt doped $Fe_3O_4$ or ferromagnetic chromium dioxide may also be used as magnetic pigment.

The binders used for the dispersion of magnetic pigment may be the usual binders used for the preparation of magentic layers, such as copolymers of vinyl chloride, vinyl acetate and vinyl alcohol, copolymers of vinylidene chloride and acrylonitrile, polyvinyl acetals such as polyvinyl formals, polyester/polyurethanes, polyurethane or polyether elastomers, phenoxy or epoxy resins and mixtures of these substances.

The magnetic powder is intensively mixed with a suitable quantity of solvent and a suitable quantity of a dispersion auxiliary and of a binder mixture and subjected to a process of preliminary dispersion, for example in a dissolver, a kneader, a colloid mill, a ball mill or some other apparatus which produces high shearing forces.

The second stage of dispersion may be carried out, for example, in a pearl mill in which the intensity of grinding may be controlled by varying the size and quantity of the grinding elements, the speed of rotation and the rate of throughput of dispersion.

For obtaining a narrow range of pigment distribution, the magnetic dispersion is advantageously passed several times from a first storage vessel into a second storage vessel through one or more grinding apparatus such as the pearl mills mentioned as examples.

According to the invention, an equal amount of the dispersion stabilizing component is added to the magnetic dispersion after each passage through the grinding apparatus before the next passage through the grinding apparatus. This procedure is repeated until the material has been ground down sufficiently finely. This is ascertained by determining the gloss and the capacity for orientation of a test tape after each passage.

After this fine dispersion stage has been completed, the remaining quantities of binders or additives may be added to the magnetic dispersion.

Subsequent coating of the non-magnetic layer support with the magnetic dispersion is carried out in accordance with the state of the art, for example by means of reverse roll coaters, screen printing castors or extrusion castors.

The layer supports may be films of polyesters such as polyethylene terephthalate, polyolefines such as polypropylene, cellulose derivatives such as triacetate or polycarbonates or they may be rigid layer supports of non-magnetic metals such as aluminium or ceramic materials.

Subsequent treatment of the coated materials, such as surface smoothing by calendering, cutting and packaging, are carried out in known manner.

The following properties of a magnetec tape separated into width of 8 mm are described to demonstrate the advantages of the process according to the invention.

1. Orientation

The magnetic orientation $M_R/M_S$ is used as a measure of the quality of dispersion obtainable. The measurement is carried out in a vibration magnetometer at a saturation magnetization of 6 kOe.

2. Gloss

The gloss immediately after application of the layer is determined as another measure of the quality of dispersion and the surface smoothness of the storage medium. This measurement is carried out in a gloss measuring apparatus of Lange at a reflection angle of 60°.

3. Storage Technique

The signal/noise difference of a 5 MHz signal is determined on an 8 mm video recorder (EV-A 300 of Sony). An internal reference is used as reference band.

4. Solids Content

The solids content indicated is calculated from the quotient of the masses of all the solid substances used to the total mass of the magnetic dispersion multiplied by 100.

The invention is described below with the aid of examples. A special embodiment of the magnetic recording medium according to the invention is based on the following formulation:

EXAMPLE 1

| | |
|---|---|
| Magnetic pigment (Fe/Ni alloy; $I^H c$: 1500 Oe, BET: 48 m$^2$/g) | 100 parts by weight |
| Non-magnetic pigment ($Cr_2O_3$; average particle size <0.3 μm) | 5 parts by weight |
| Dispersion auxiliary (myristic acid) | 2 parts by weight |
| Dispersion stabilizing component (polyiminopolyester) | 5 parts by weight |
| Binder 1 (vinyl chloride/vinyl acetate/ vinyl alcohol copolymer) | 10 parts by weight |
| Binder 2 (polyester polyurethane) | 12 parts by weight |
| Lubricant (stearic acid) | 1 part by weight |
| Cross-linking agent (trifunctional isocyanate) | 4 parts by weight |
| Solvent | |
| tetrahydrofuran | 220 parts by weight |
| toluene | 135 parts by weight. |

The magnetic pigment, the non-magnetic pigment, the dispersion auxiliary and the binders are stirred into the solvent and subjected to a preliminary size reduction in a colloid mill.

The subsequent dispersion is carried out in a ball mill in which 0.5 parts by weight of the dispersion stabilizing component is stirred in for 10 minutes after each of the required total of 10 passages through the mill.

After the substance has been ground down to the desired particle size, the lubricant and the cross-linking agent are stirred in. The dispersion obtained is then applied to a polyester layer support in known manner, orientated magnetically, dried, calendered and separated into widths of 8 mm.

COMPARISON EXAMPLE 1

In this case the whole of the dispersion stabilizing component is added all at once to the other components; the procedure is otherwise the same as in Example 1. In addition, solvent mixture is added until the viscosity has been adjusted to the processing viscosity of Example 1.

COMPARISON EXAMPLE 2

The dispersion stabilizing component is added only after the desired degree of fineness of grinding has been obtained; the procedure is otherwise the same as in Example 1. In addition, solvent mixture is added in the amount required to adjust the viscosity to the processing viscosity of Example 1.

COMPARISON EXAMPLE 3

The procedure is the same as in Example 1 but in this case no dispersion stabilizing component is added.

EXAMPLE 2

The dispersion stabilizing component added is ethylene distearyl diamide; the procedure is otherwise the same as in Example 1.

EXAMPLE 3

The polymeric dispersion stabilizing component used is a polyurethane containing sulphonate groups; the procedure is otherwise the same as in Example 1.

EXAMPLE 4

A magnetic dispersion containing $CrO_2$ was prepared from the following formulation:

| | |
|---|---|
| Magnetic pigment ($CrO_2$; $I^{Hc}$: 650 Oe, BET: 28 m$^2$/g) | 100 parts by weight |
| Dispersion auxiliary (lecithin) | 1 part by weight |
| Dispersion stabilizing component (lecithin) | 2 parts by weight |
| Binder 1 (vinyl chloride/vinyl acetate/ vinyl alcohol copolymer) | 6 parts by weight |
| Binder 2 (Polyester polyurethane) | 14 parts by weight |
| Lubricant (stearic acid) | 0.5 parts by weight |
| Cross-linking agent (trifunctional isocyanate) | 3 parts by weight |
| Solvent | |
| tetrahydrofuran | 150 parts by weight |
| cyclohexanone | 50 parts by weight |

COMPARISON EXAMPLE 4

The whole of the dispersion stabilizing component is added at the beginning to the other components; the procedure is otherwise the same as in Example 4. In addition, solvent mixture is added until the viscosity has been adjusted to the processing viscosity of Example 4.

The results of the experimental examples are shown in Table 1.

| Example | $M_R/M_S$ | Gloss | S/N at 5 MHz dB | Solids % by weight |
|---|---|---|---|---|
| 1 | 0.84 | 70 | +1.7 | 28.1 |
| Comparison Example 1 | 0.82 | 48 | +0.5 | 27.2 |
| Comparison Example 2 | 0.81 | 43 | 0 | 26.9 |
| Comparison Example 3 | 0.78 | 40 | −1.3 | 26.0 |
| 2 | 0.83 | 65 | +1.3 | 27.8 |
| 3 | 0.82 | 62 | −0.9 | 27.6 |
| 4 | 0.85 | 70 | 1.4* | 38.7 |
| Comparison Example 4 | 0.82 | 58 | 0.2* | 36.2 |

*This measurement was carried out on a half inch video tape on a VHS recorder (Panasonic).

The results show that when the addition of dispersion stabilizing component is evenly distributed over the whole time of dispersion, the orientation and gloss and the recording values of the magnetic recording medium produced are substantially improved.

We claim:

1. A method for preparing a magnetic recording medium, comprising the steps of:
   (a) mixing magnetic pigment particles with a solvent and a binder;
   (b) dispersing the mixture;
   (c) finely dispersing the dispersed mixture while adding to the mixture at a uniform rate over the whole period of dispersion a dispersion stabilizing component; and
   (d) applying the finely dispersed mixture to a layer support to form a magnetic layer.

2. The method of claim 1, wherein the dispersion stabilizing component of step (c) has a molecular weight below 10,000.

3. The method of claim 1, wherein the dispersion stabilizing component of step (c) is a mixed ester of a polyethoxy phosphate ester or ethylene diaminodistearate.

4. The method of claim 1, wherein the dispersion stabilizing component of step (c) is a highly purified lecithin.

5. The method of claim 1, wherein the dispersion stabilizing component of step (c) has a molecular weight between 10,000 and 100,000.

6. The method of claim 1 wherein the dispersion stabilizing component of step (c) is a polyurethane resin having sulphonate groups.

7. The method of claim 1 wherein the dispersion stabilizing component of step (c) is a vinyl chloride/vinyl alcohol copolymer containing an acid group selected from the group consisting of carboxylic acids, phosphoric acids, sulphonic acids, carboxylic acid salts and sulphonic acid salts.

8. The method of claim 1 wherein a dispersion auxiliary is mixed with the particles, the solvent and the binder in step (a).

9. The method of claim 1 wherein the degree of dispersion is ascertained after the addition of the dispersion stabilizing component during step (c).

10. The method of claim 1 further comprising after step (c) the step:
    (e) mixing with the finely dispersed mixture one or more additives selected from the group consisting of lubricants, binders or hardeners.

11. A method for preparing a magnetic recording medium, comprising the steps of:
    (a) mixing magnetic pigment particles with a solvent and a binder;
    (b) dispersing the mixture;
    (c) finely dispersing the dispersed mixture in a grinding apparatus;
    (d) adding a dispersion stabilizing component to the mixture after each passage of the mixture through the grinding apparatus; and
    (e) applying the finely dispersed mixture to a layer support to form a magnetic layer.

* * * * *